April 3, 1934.    L. L. WICKLAND    1,953,791
VISOR
Filed July 17, 1931
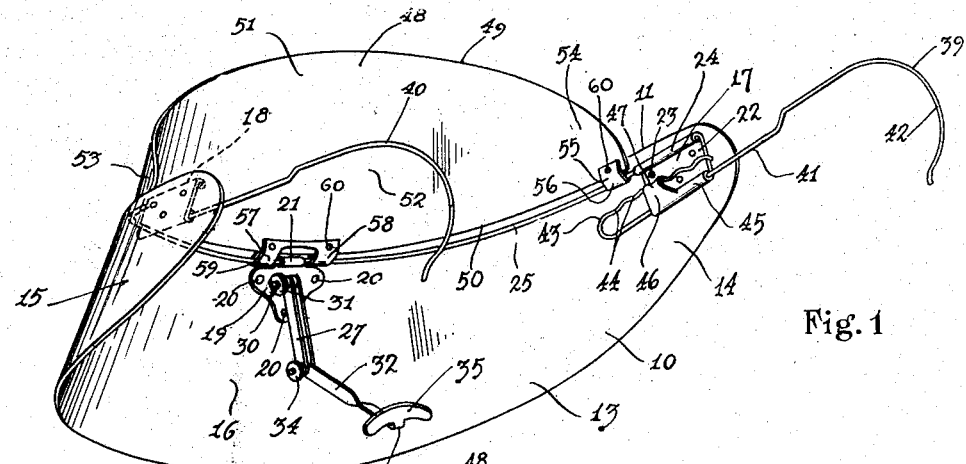
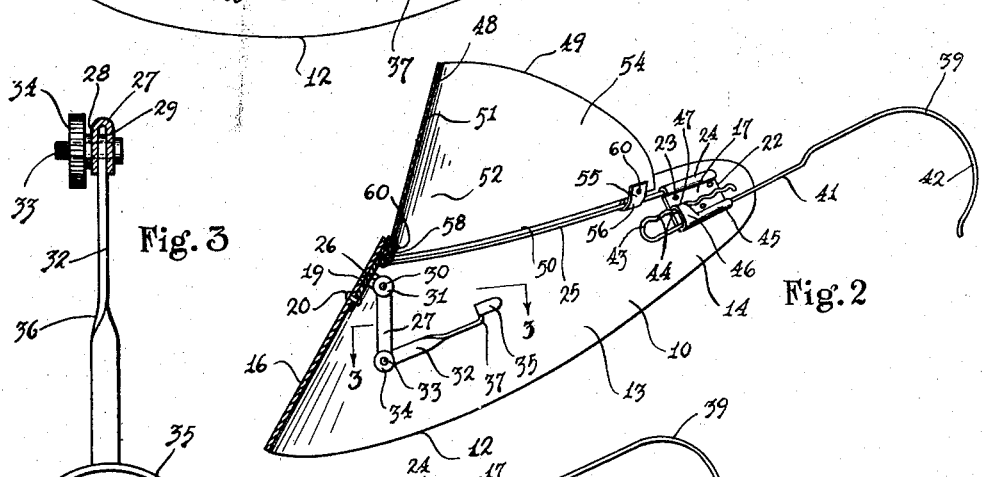
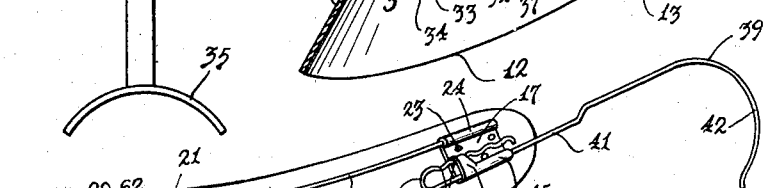
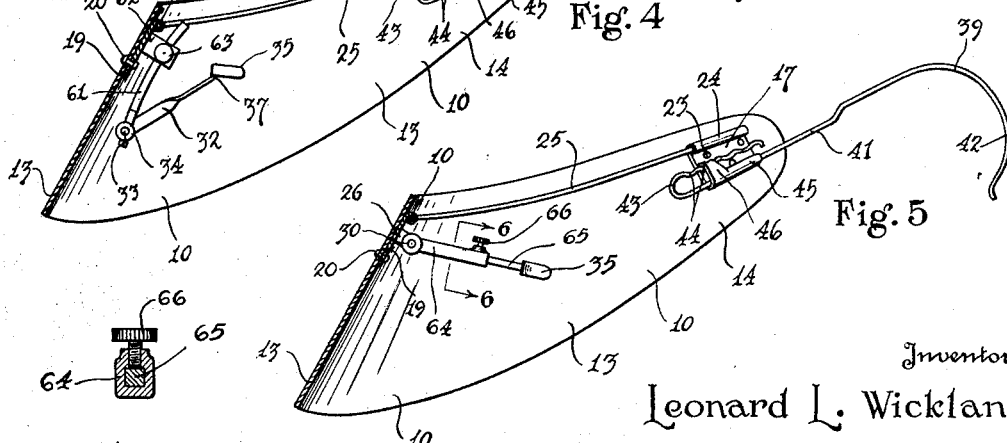
Inventor
Leonard L. Wickland
By Caswell & Lagaard
Attorneys Patented Apr. 3, 1934

1,953,791

UNITED STATES PATENT OFFICE 1,953,791

VISOR

Leonard L. Wickland, Minneapolis, Minn.

Application July 17, 1931, Serial No. 551,349

17 Claims. (Cl. 2—12)

My invention relates to visors and has for its object to provide a visor having an adjustable nose piece whereby the visor may be properly positioned with respect to the head of the user.

Another object of the invention resides in providing a visor having adjustable temples which may be adjusted to fit the head of the user.

An object of the invention resides in constructing the visor with a principal shade formed of flexible material and in providing a reinforcing member for stiffening said shade.

Another object of the invention resides in providing three mountings attached to the shade, one at each end thereof and one substantially at the middle of the shade and in securing said reinforcing member to said mountings.

A feature of the invention resides in constructing said mountings with eyes into which the reinforcing member is inserted.

An object of the invention resides in attaching the nose piece to the middle mounting and in attaching the temples to the end mountings.

A still further object of the invention resides in providing an auxiliary shade adapted to be attached to the shade through said reinforcing member at localities intermediate said mountings.

An object of the invention resides in constructing the nose piece so that the same may be adjusted both in an up and down direction and in an anterior-posterior direction.

Another object of the invention resides in providing two arms connected to the nose piece and to the central mounting, one of said arms being movable in an anterior-posterior direction and the other being movable in an up and down direction, said arms being connected together.

An object of the invention resides in pivoting said arms together and in pivoting one of said arms to said mounting and in attaching the other of said arms to the nose piece.

A still further object of the invention resides in providing as an alternate construction a visor in which one of the arms is slidable to provide either up and down adjustment or anterior-posterior adjustment.

Another object of the invention resides in slidably mounting one of the arms relative to the visor and in pivoting the other arm thereto, said latter arm carrying the nose piece.

A still further object of the invention resides in providing, as another modification of the invention, an arm pivoted to the mounting carried by the shade and swingable in an up and down direction, together with a second arm carrying the nose piece and telescoping with respect to the first named arm.

An object of the invention resides in constructing the end mountings of the visor with guides and in providing temples formed of wire slidable and rotatable along said guides.

A feature of the invention resides in constructing said temples with offset portions and in providing cooperating members on said end mountings for engagement with said offset portions to hold said temples from rotation within said guides.

Another object of the invention resides in providing notches in either of the temples or the mountings and in providing the others thereof with members adapted to engage within said notches to hold the temples in adjusted position relative to said guides.

A still further object of the invention resides in forming said offset portions with said notches and in constructing the engaging members on said mountings.

A feature of the invention resides in constructing a stop on the temple engageable with the guide for limiting the movement of the temple.

A still further object of the invention resides in leaving the offset end of the temple free so that the same may be disengaged from the engaging member thereof to permit the temple to be swung within its guide.

Other objects of the invention reside in the novel combination and arrangement of parts and in the details of construction hereinafter illustrated and/or described.

In the drawing:

Fig. 1 is a perspective view of a visor illustrating an embodiment of my invention.

Fig. 2 is an elevational sectional view of the visor taken through the medial plane.

Fig. 3 is a plan sectional view taken on line 3—3 of Fig. 2.

Fig. 4 is a view similar to Fig. 2 showing a modification of the invention.

Fig. 5 is a view similar to Fig. 4 showing still another modification of the invention.

Fig. 6 is a detail sectional view taken on line 6—6 of Fig. 5 and drawn to a larger scale.

In the use of visors of the nature illustrated employing a shade for shading the eyes from the sun or other sources of light, considerable difficulty has been encountered in providing a visor which would fit any person desiring to use the same. At the same time, the user encounters considerable discomfort where the visor is so constructed that the upper edge of the shade comes in contact with the forehead of the user. The present invention provides a device which overcomes the various disadvantages of such visors.

My invention proper consists of a shade 10, which may be constructed of celluloid or any suitable material such as is now well known and customarily used in the construction of visors. The shade 10 is preferably flexible so it may be flattened out and placed in a suitable box, carton or envelope of relatively small depth and so that the same may be readily erected and caused to conform to the shape of the head when desired for use. The shade 10 is constructed crescent shape, having an upper edge 11, and lower edge 12, meeting said upper edge and defining a body portion 13 therebetween having end portions 14 and 15 and an intermediate portion 16. When the shade is bent into the desired form, said shade extends about the forehead of the user and projects outwardly therefrom in a manner to shade the user's eyes and produce the desired results. When shade 10 is bent into form, the upper edge 11 of said shade extends substantially in a single plane and encircles the forehead of the user.

To the end portions 14 and 15 of the shade 10 are attached mountings 17 and 18 which are identical in construction excepting that one of these mountings is left handed and that the other is right handed. In addition to these other mountings, a mounting 19 is employed which is attached to the intermediate portion 16 of the shade. These mountings will now be described in detail.

The mounting 19 is preferably constructed from sheet metal and is shaped in the form of a cloverleaf. Through the various lobes of this mounting and through the shade 10 are passed rivets 20 by means of which the mounting is secured to the body 13 of said shade. The upper edge of the mounting 19, near the stem portion thereof, is bent back upon itself as indicated at 21 to form an elongated eye parallel to the upper edge 11 of the shade and in close proximity thereto.

The two mountings 18 and 17 are also constructed from sheet metal and are provided with body portions 22 which have rivets 23 extending therethrough and through the end portions 14 and 15 of the body 13, whereby these mountings are securely attached to the shade proper. The upper ends of the mountings 17 and 18 are turned back upon themselvs as designated at 24 to form other elongated eyes similar to the eye 21. These eyes are disposed parallel to the edge 11 and in close proximity thereto and are in substantial alignment with each other and with the eye 21.

For the purpose of stiffening the shade 10, which as stated, is preferably constructed flexible, a reinforcing member 25 is employed which is formed of spring wire normally bent into the desired shape. This member is insertable into all of the eyes 21 and 24 and when disposed therein becomes rigidly attached to the mountings 17, 18 and 19. Due to the length of the eyes 21 and 24, considerable lateral rigidity is imparted to the shade 10 through the reinforcing member 25 which serves to hold the shade in erected position. The eyes 21 and 24 are constructed to snugly engage the member 25 and to exert sufficient friction upon the same to hold the parts in proper position. A certain degree of resiliency is afforded in these eyes due to the fact that the ends of the metal from which they are constructed is free from the various mountings from which the same are formed.

At the center of the mounting 19 is provided an outwardly extending stud 26, (Fig. 2) which may be struck out from the body of said mounting or which may be riveted or soldered thereto as desired. This stud has pivotally connected to it, an arm 27 which is preferably U-shaped in cross section as shown in Figs. 1 and 3 to provide two parallel spaced portions 28 and 29. The stud 26 lies between the two portions 28 and 29 and a bolt 30 passing through said portions and stud form a pivot whereby the arm 27 may swing relative to the mounting 19. A nut 31, screwed upon the end bolt 30 serves to clamp the arm in adjusted position relative to mounting 19 when proper adjustment of the said arm is had.

Pivotally connected to the arm 27 is another arm 32 which is formed of sheet material and is adapted to be disposed between the portions 28 and 29 of the arm 27. This latter arm is pivoted to the arm 27 through a bolt 33, shown in detail in Fig. 3. A nut 34 screwed upon the end of the same serves to clamp the two arms 27 and 32 together to hold the same from movement relative to one another. The arm 32 is preferably constructed of sheet metal as illustrated and is provided with a nose piece 35 formed integral therewith. Arm 32 is given a quarter twist indicated at 36 intermediate the length thereof to cause the nose piece 35 to extend in the proper direction and the said nose piece is bent upwardly as designated at 37 to cause the extended surface thereof to engage the nose of the user when the nose piece is in proper position.

The temples of the invention are indicated at 39 and 40. These temples are identical in construction and only the temple 39 will be described in detail. This temple is constructed from wire and is formed with a straight portion 41 and a bow 42 connected therewith. At the end of the straight portion 41 is provided an offset portion 43 which follows along the straight portion 41 and is spaced therefrom. The portion 43 is preferably formed with a series of notches 44 therein lying in the plane of the bow 42. The straight portion 41 of the temple 39 is slidably mounted in a guide 45 formed on the body 22 of the mounting 17. This guide is constructed by turning the portion of the metal of body 22 at the lower end of said mounting back upon itself in much the same way as the eye 24 of said mounting. The straight portion 41 of the temple 39, being constructed of wire, becomes both slidably and rotatably mounted in the guide 45. For engagement with the offset portion 43 of temple 39, an engaging member 46 is employed which is bent up from the metal of the body 22 of said guide and which is constructed with a curved shoulder 47 engageable in any of the notches 44 of said offset portion. When the temple is slid along the guide 45, the shoulder 47 rides along notches 44 and engages within the same to hold the temple in adjusted position. The portion 46 is spaced from the body 22 of mounting 17 so as to hold the temple from rotation when the offset portion 43 is disposed between it and said body. When the temple 39 is slid inwardly along the guide 45 a sufficient distance, the offset portion 43 becomes disengaged from the member 46 and the temple may then be rotated. When so disposed, the temple may be rotated through an angle of 180° to bring the bow 42 in a position to occupy less space when the device is packed so that a smaller box can be used for the housing of the same.

The auxiliary shade used with the invention is illustrated at 48 in Figs. 1 and 2 and is arranged with reference to the shade 10 so as to extend upwardly in front of the forehead of the user when the visor is in use. This shade is particularly advantageous for preventing sunburn of the forehead when the visor is used by athletes or others desiring protection from the sun. The auxiliary shade 48 is formed with edges 49 and 50, the edge 49 extending along the top of the shade and the edge 50 extending along the bottom of the shade, said edges defining a body 51 having an intermediate portion 52 and two end portions 53 and 54. When the shade is bent to conform in curvature to the shade 13, the edge 50 lies parallel with the edge 11 of the principal shade. To the end portions 53 and 54 are attached clips 55 which are constructed with eyes 56 similar to the eyes 24. Similar clips 57 and 58 may be employed at the center of the auxiliary shade 48, which are likewise constructed with eyes 59. These clips may be connected together if desired and are so arranged as to straddle the eye 21 on mounting 19, while the two clips 55 are disposed inwardly of the eyes 24 so that said clips clear the mountings 17 and 18. The various clips 55, 57 and 58 are attached to the auxiliary shade 48 through rivets 60 in identically the same manner as the mountings 17, 18 and 19.

The use of my invention is as follows: When packed, the shades 13 and 48 lie flat in the box and the reinforcing member 25 is detached therefrom. In the erection of the visor, the reinforcing member 25 is first threaded through the various eyes 24 and 21 of the mountings 17, 18 and 19. This gives shape to the visor holding the shade 13 properly curved as desired. If the auxiliary shade 48 is to be used with the principal shade 13, the reinforcing member 25 is also inserted through the eyes 56 and 57 of the various clips 55, 58 and 59. This holds the auxiliary shade rigidly attached to the principal shade through the agency of the single reinforcing member 25. In the packing of the device, the temples 39 and 40 are disengaged from the members 46 and turned in the opposite direction. These temples, when the device is desired for use, are turned back again and the offset portions 43 sprung toward the straight portions 41 so that the ends thereof may be engaged beneath the shoulders 47 of the members 46. The temples are then drawn outwardly and the bows brought into proper position as shown in Fig. 1. The two nuts 31 and 34 are next loosened and the arms 27 and 32 swung to bring the nose piece 35 into proper position to engage the nose of the wearer. In mounting the device, the shade 48 and the free edge 11 of the shade 13 are adjusted to project outwardly beyond the forehead of the wearer so as to permit of ventilation between the shade and the person or wearer thereby making the visor extremely cool and comfortable to wear. When the parts have all been adjusted, the nuts 31 and 34 are tightened, holding the nose piece in place. The shoulder 47 engaging within the various notches 44 of the offset portion 43 serve to hold the temples in proper position.

In Fig. 4, I have shown a modification of the invention in which a sliding arm 61 is employed instead of the swinging arm 27. In this form of the invention, the arm 32 is pivoted to the arm 61 in substantially the same manner as shown in Fig. 3. The arm 61 is preferably square in cross section and is slit to receive the pivoted end of arm 32. For supporting the arm 61, a standard 62 is employed which is attached to the mounting 19 on the shade 10. This standard is provided with a hole through which the arm 61 may slide, which hole is so located that the said arm may be moved in an up and down direction. A set screw 63, threaded in the standard 62 serves to lock the arm 61 in any of its adjusted positions. By raising and lowering arm 61 and by swinging arm 32 about its pivot, any adjustment of nose piece possible with the form of the invention shown with Fig. 1 may also be had with the device shown in Fig. 4.

In Fig. 5 another form of the invention has been illustrated. In this device, a tubular arm 64 is employed in place of the arm 27 of the device shown in Fig. 1. This tubular arm is pivoted to the stud 26 through a bolt 30 in much the same manner as the arm 27. Within the tubular arm 64 is slidably mounted a bar 65 which takes the place of the arm 32. A set screw 66 threaded into the arm 64 serves to hold the arm 65 in adjusted position. Nose piece 35 may be secured to the end of the arm 65 in any suitable manner. By swinging the arm 64 on its pivot 30, the up and down adjustment of the nose piece 35 may be had. By telescoping the rod 65 within the tubular arm 64, the anterior-posterior position of the nose piece 35 may be varied.

My invention is highly advantageous in that an extremely simple and practical device is provided, whereby the eyes of the user may be properly shaded. By use of the auxiliary shade, the sun may also be kept away from the forehead of the user. The device may be adjusted to fit any person and may be so positioned relative to the wearer as to hold the shade spaced from the wearer's head to permit of circulation of air between the visor and the wearer's head. The visor may be packed in a compact form so as to occupy relatively little space. All of the parts may be independently adjusted and securely locked in position when properly adjusted. The device may be also worn by a user employing ordinary glasses. The device functions to give the user the greatest comfort without irritation or injury to any portion of the user's person with which it comes in contact.

Changes in the specific form of my invention as herein disclosed may be made within the scope of what is claimed, without departing from the spirit of my invention.

Having described my invention, what I claim as new and desire to protect by Letters Patent is:

1. A visor comprising a shade, a mounting secured to said shade, two arms connected together, one of said arms being carried by said mounting, a member carried by the other of said arms and having a fixed situs with respect to the nose of the wearer, means for guiding one of said arms for movement in an anterior-posterior direction and means for guiding the other of said arms for movement in an up and down direction to produce adjustment of said shade.

2. A visor comprising a shade, a mounting secured to said shade, an arm pivoted to said mounting and movable in a substantially anterior-posterior direction, a second arm pivoted to said first arm movable in an up and down direction and a member carried by said second arm and having a fixed situs with respect to the nose of the wearer.

3. A visor comprising a shade, a mounting secured to said shade, an arm pivoted to said mounting and movable in an up and down direction, a second arm slidable relative to said first arm and movable in an anterior-posterior direction, and a member carried by said second arm and having a fixed situs with respect to the nose of the wearer.

4. A visor comprising a shade, a mounting secured to said shade, an arm slidable along said mounting in an up and down direction, a second arm pivoted to said first arm and movable in an anterior-posterior direction and a nose piece carried by said second arm.

5. A visor comprising a shade constructed of flexible material, a plurality of mountings attached to said shade at spaced localities thereon, an elongated reinforcing member secured to said mountings, and an auxiliary shade having clips thereon, said clips engaging said reinforcing member at localities intermediate the mountings on said principal shade.

6. A visor comprising a shade constructed of flexible material, mountings attached to said shade at the ends and at the center thereof, said mountings being constructed of sheet material and having portions bent up therefrom to provide aligning eyes and a wire reinforcing member insertable into the eyes of said mountings and free from the shade intermediate said mountings for stiffening said shade.

7. A visor comprising a shade, a mounting at one end of said shade, a detachable reinforcing member attached to said mounting and being further attached to said shade, a guide formed on said mounting, a temple slidably mounted in said guide and means for holding said temple in adjusted position with respect to said guide.

8. A visor comprising a shade, a mounting at one end thereof, a guide formed in said mounting, a temple formed of wire and slidable and rotatable within said guide, said temple having an offset portion and means on said mounting for engagement with said offset portion of said temple to hold said temple in adjusted position and from rotation in said guide.

9. A visor comprising a shade, a mounting at one end thereof, a guide formed in said mounting, a temple formed of wire and slidable and rotatable within said guide, said temple having an offset portion formed with a plurality of notches therein and means on said mounting for engagement within the notches of said offset portion for holding the temple in adjusted position and for preventing rotation thereof.

10. A visor comprising a shade, a mounting at one end thereof, a guide formed in said mounting, a temple formed of wire and slidable and rotatable within said guide, said temple having an offset portion and means on said mounting for engagement with said offset portion to hold said temple in adjusted position and from rotation in said guide, said offset portion having a free end whereby the same may be disengaged from said last named means.

11. A visor comprising a shade having a mounting at one end thereof, a guide formed in said mounting, a temple formed of wire and slidable and rotatable within said guide, said temple having an offset portion and means on said mounting for engagement with said offset portion to hold said temple in adjusted position and from rotation in said guide, and a stop on said temple for engagement with said guide to limit the sliding movement of said temple.

12. A visor comprising a shade formed of flexible material, a mounting at each end of said shade, a mounting at the center of the shade, a reinforcing member attachable to all of said mountings for stiffening the shade, said reinforcing member being free from the shade throughout its extent, a nose piece carried by the intermediate mounting and temples carried by the end mountings.

13. A visor comprising a shade, a mounting at one end thereof, a guide formed in said mounting, a temple formed of wire and slidable and rotatable within said guide, said temple having an offset portion, and means for engagement with said offset portion to hold said temple from rotation in said guide.

14. A visor comprising a shade, a mounting attached to the end of said shade, said mounting having two guides therein, a reinforcing member disposed in one of said guides and a temple disposed in the other of said guides.

15. A visor comprising a shade, a mounting at one end of said shade having a guide, a temple formed of wire and slidably extending through said guide, and means formed on the inner end of said temple and slidable relative to the shade for restraining said temple from rotational movement relative to the shade.

16. In combination, a member having a fixed situs with respect to the nose of a person, an arm pivoted to said member, a second arm pivoted to the first arm, a shade, a mounting attached to said shade and pivoted to said second arm, said shade being supported by said arm and being movable with said mounting in an up and down direction and in an anterior posterior direction upon the swinging of said arms and temples movable with respect to said shade for further supporting the shade.

17. A visor comprising a shade formed of flexible material, a mounting at each end of the shade, a mounting at the center of the shade, a flexible reinforcing member secured to all three of said mountings and free from said shade intermediate said mountings for stiffening said shade, a nose piece carried by the intermediate mounting and temples carried by the end mountings.

LEONARD L. WICKLAND.